INVENTOR.
PAUL R. BALDWIN
BY J. D. Douglass
HIS ATTORNEY

Sept. 21, 1965    P. R. BALDWIN    3,207,118
BOAT PROPULSION SYSTEM
Filed Sept. 24, 1963    5 Sheets-Sheet 2
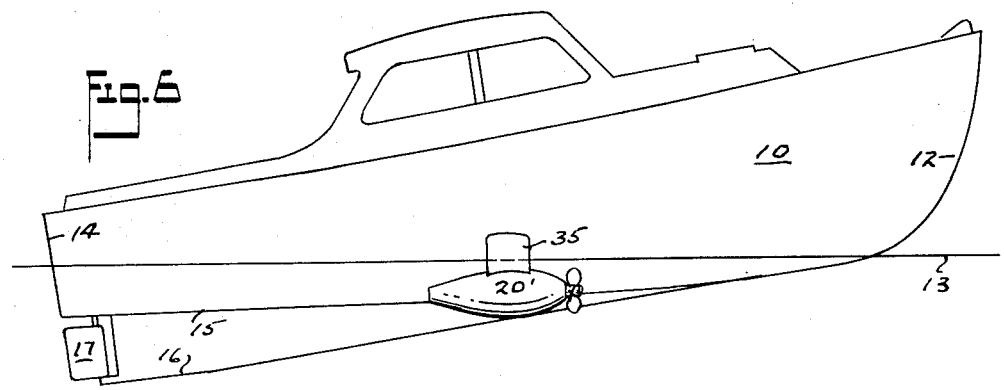
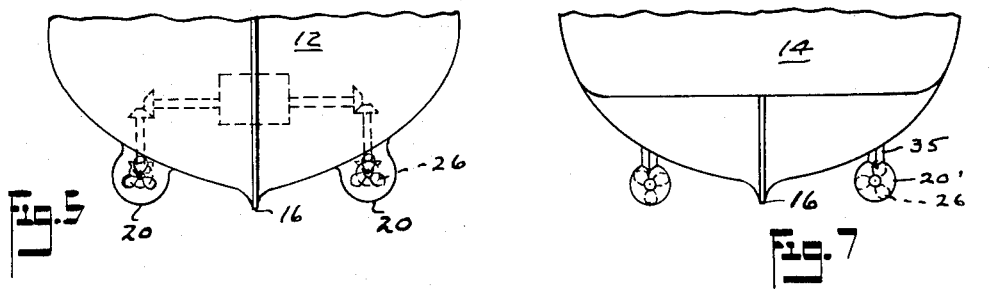
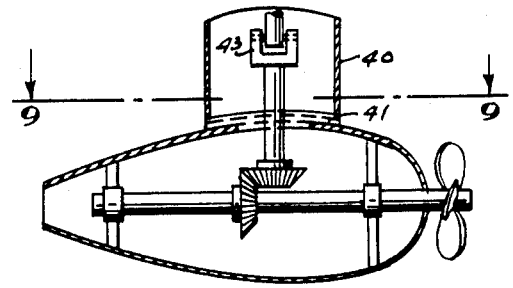
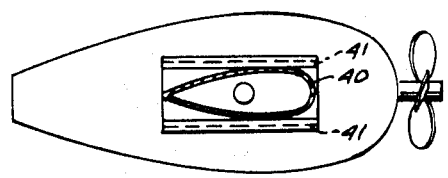
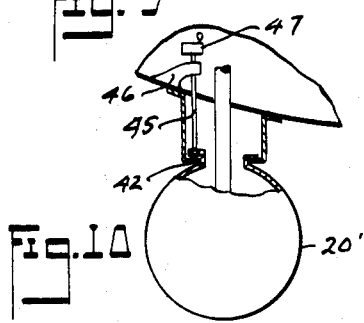
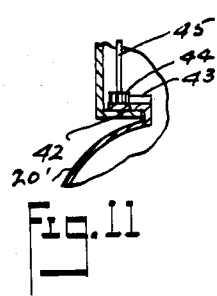
INVENTOR.
PAUL R. BALDWIN
BY
*J. D. Douglass*
HIS ATTORNEY

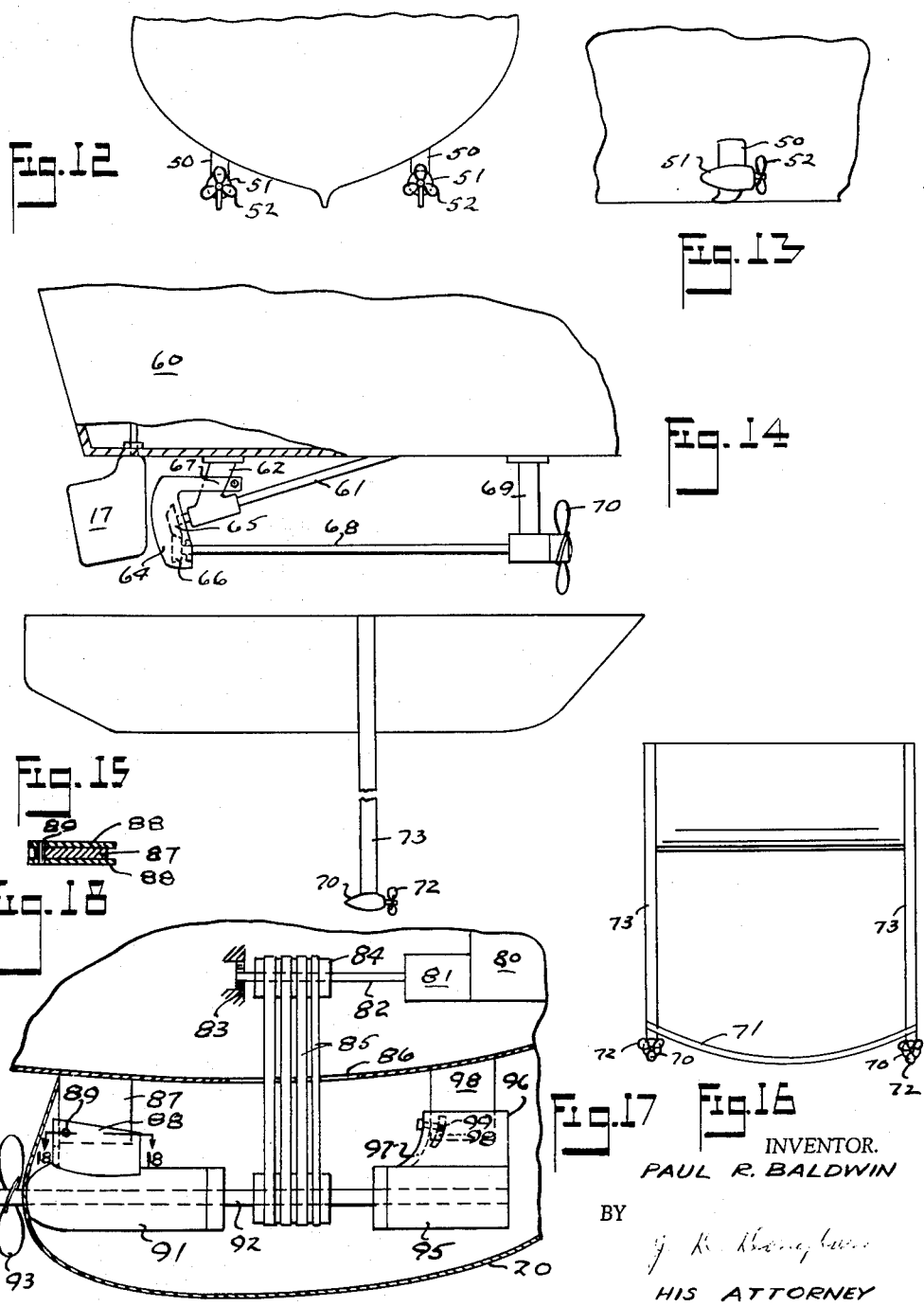

INVENTOR
Paul R. Baldwin
BY
his ATTORNEY

Sept. 21, 1965 P. R. BALDWIN 3,207,118
BOAT PROPULSION SYSTEM
Filed Sept. 24, 1963 5 Sheets-Sheet 5

INVENTOR
Paul R. Baldwin
BY
ATTORNEY

United States Patent Office 3,207,118
Patented Sept. 21, 1965

3,207,118
BOAT PROPULSION SYSTEM
Paul R. Baldwin, R.D. 1, Box 404, Valley City, Ohio
Filed Sept. 24, 1963, Ser. No. 311,016
11 Claims. (Cl. 115—37)

This invention relates to improvements in boat propulsion systems. It is a continuation-in-part of my copending applications Serial No. 859,035, of Dec. 11, 1959 and Serial No. 145,598 of Oct. 17, 1961.

Heretofore it has been common practice to propel boats by means of a bladed propeller or propellers of the pusher type, commonly called screw propellers, which are disposed below the water line at the stern of the boat. The motive power is usually one or more internal combustion engines disposed forward of the stern, usually amidship, and connected by a transmission and drive shaft to the propeller. It is customary for the drive shaft to extend through a suitable water-tight seal in the bottom of the hull at an angle. The result is that the axis of the propeller is usually at an angle which slants downward and rearward.

In such a system when the boat comes up to cruising speed, and the bow rises and the entire angle of the attack of the boat is increased. The angle of the axis of the propeller relative to the surface of the water is also increased. The result is that a portion of the propeller effort is tending to push the entire boat out of the water and this power, which should be used to drive the boat forward is wasted.

In such boats, the rudder or rudders are usually immediately to the rear of the propeller and the force of the water backward alongside the rudders causes a stiffening effect thereon that increases the effort required to steer and also causes the steering to be sluggish.

At higher speeds, the wake of the vessel causes a trough where the propellers operate and it is not uncommon for the blades to break through the water, resulting in a racing of the engine, which is damaging thereto. When the propellers break through periodically both they and the engine are subjected to alternate periods of load and no load which causes acceleration and sudden load pitching that is damaging to the boat as well as being undesirable to the occupants. In rough seas the stern of the boat may rise, due to the pitching as it rides on the crest of a wave, and the propeller then breaks through and races. This also results in a temporary loss of control because neither the propellers nor the rudder are in the water. It also presents a loss of stability previously mentioned. Should only one propeller break through, the boat veers to the port or starboard.

By the present invention I have provided a propulsion system where the steering ability is made easier and more effective. The power of the propellers is utilized in such a manner that substantially all the effort is used to pull the boat forward and little, if any, effort wasted in trying to push the boat out of the water. The propellers are so positioned that the force of the water backward under the boat has a stabilizing influence on the boat, materially lessening the rolling and pitching of the boat even in high seas. The propellers do not have the tendency to break water due to the passage over crests, or due to the wake of the boat, or to cause cavitation such as is common in conventional stern drives.

Furthermore the boat, at cruising speed, has a much less rise of the bow but rises higher in the water from bow to stern. The first provides greater visibility and greater comfort for the occupants and the second provides greater buoyancy for the boat and less draft and decreased resistance to the water.

Briefly, my invention contemplates placing the propellers amidship or slightly aft or forward of the center of gravity, which is usually amidship, and so positioning the propeller that the thrust provided thereby is in a horizontal direction so that all of the forces of the propulsion system are in a horizontal forward direction.

In one embodiment of the invention the propeller and its driving shaft are supported by a nacelle which is secured to the underside of the hull.

The tilt of the propeller and the nacelle is such that at cruising speed the propeller axis and the nacelle are substantially horizontal. When the ship is at rest or traveling at very low speeds, the tilt is slightly downward in a forward direction. This provides a decided advantage in that at low speeds vector forces due to the pull of the propeller are such, the propeller being disposed close to the center of gravity, that the tendency is to pull the stern down and the bow up and the horizontal stability is improved and pitching reduced. Thus, even at low speeds, the efficiency of the boat increases because the bow comes up and the boat is not as deeply submerged, as is usually the case, just behind the bow. As the speed is increased and the bow comes up still further, the propeller and its nacelle come up to a horizontal position. At this time the efficiency is even greater, because the pull is all in a straight forward direction and parallel to the surface of the water. In other words, the push or pull of the propeller is in a straight forward and horizontal direction. There is no upward thrust movement which merely raises the boat out of the water and does not materially add to the forward speed as in conventional systems. As is well known to these versed in the art, in stern drive vessels, it is nearly impossible, without the use of complicated universal joints, to drive the propeller so that the thrust is horizontal, but it is usually in an upward direction and this condition is unduly exaggerated as the bow comes up and the stern goes down, with the result that the low riding stern causes a very severe wake and/or rooster tails and sometimes a trough so deep that it exposes the tips of the propeller blade, making it necessary to mount the propeller lower, increasing the angle and causing the upward thrust to be even greater.

Due to the movement of the water under the hull by the propeller of the present invention, the skin resistance effect of the water on the hull is decreased. Since all of these factors tend to increase the propeller efficiency the actual r.p.m. may be reduced, which causes less wear on all parts including the engine. Propeller life is also increased because with the lower propeller r.p.m. there is less cavitation. This reduction in r.p.m also reduces the slip ratio which provides for increased efficiency, especially at higher speeds.

Since the propellers are enable to operate at their peak efficiency, engine speed may be reduced, which results in longer engine life, decreased fuel consumption and decreased cavitation and erosion of the propellers.

Still other advantages of the invention, and the invention itself, will become more apparent from the following description of some embodiments thereof, which are illustrated in the accompanying drawings and form a part of the application.

In the drawings:

FIG. 5 is a fragmentary elevational view of the boat of FIG. 1 from the bow;

FIG. 6 is a side elevational view of a boat in a cruising position and illustrating a modified form of drive;

FIG. 7 is a fragmentary elevational view of the boat of FIG. 6, taken from the stern;

FIG. 8 is a vertical section through a nacelle and strut of a drive similar to FIG. 3, with the interior parts shown in elevation;

FIG. 9 is a section on the line 9—9 of FIG. 8;

FIG. 10 is a fragmentary rear elevational view of the drive similar to that of FIG. 9;

FIG. 11 is an enlarged fragmentary section thereof;

FIG. 12 is a fragmentary view taken from the bow of another modification of the invention;

FIG. 13 is a fragmentary side elevational view of the embodiment of FIG. 12;

FIG. 14 is a fragmentary elevational view of the stern of a boat, taken from the side, of another modification of the invention;

FIG. 15 is a side view of a hydroplane embodying the invention;

FIG. 16 is a front elevational view thereof;

FIG. 17 is a fragmentary view of the bottom of a boat and a nacelle, shown in section, and illustrating another embodiment of the invention;

FIG. 18 is a section on the line 18—18 of FIG. 17;

Briefly, the invention, in its broader aspects, contemplates the use of tractor propellers that pull the boat rather than push it, and which are hereinafter referred to as tractor propellers. In addition, the propellers are placed under the boat, away from the stern, and although the exact position may be varied they are preferably placed slightly aft of the mid section of the boat or about one-third of the boat length forward from the stern. The propellers have their axes inclined downward when the boat is at rest and the inclination is such that when the boat comes up to cruising speed the rise of the bow causes the axes of the propellers to be substantially parallel to the surface of the water.

Figure 1:
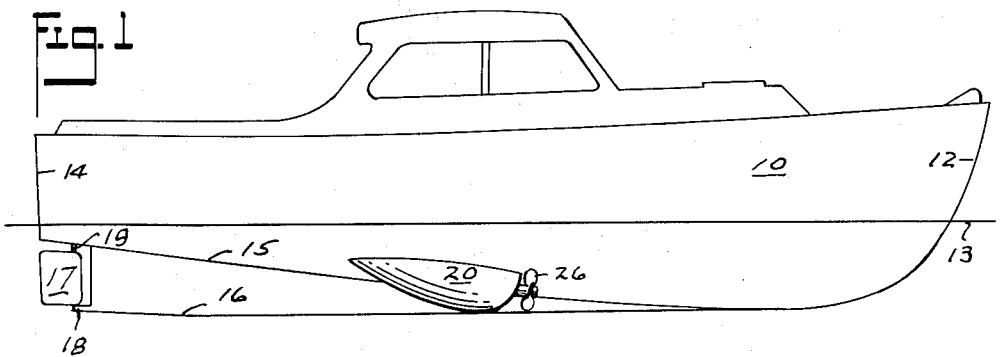
FIG. 1 is a side elevational view of a motor boat in a stationary position, showing my invention.
Figure 2:
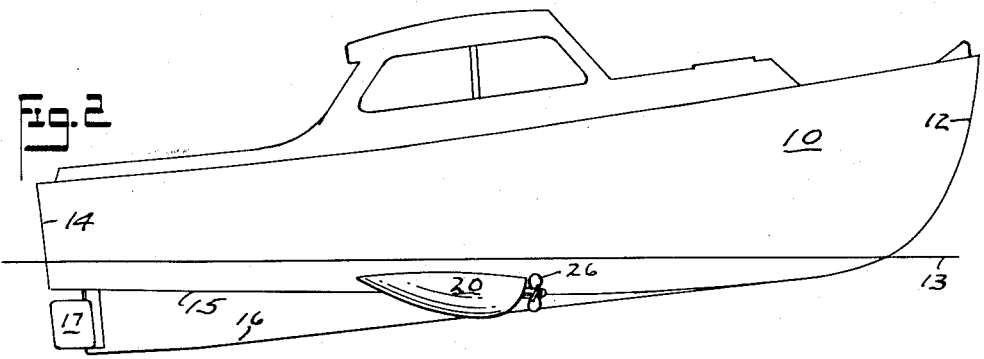
FIG. 2 is a side elevational view of the boat of FIG. 1 in the position it attains at cruising speeds.

Referring now to the drawings throughout which like parts have been designated by like reference characters, as best shown in FIGS. 1 and 2, a boat hull 10 is provided, having a bow 12 and a stern 14. The bottom of keel 15 decreases in depth from the bow to the stern and is provided with a false keel 16 which serves as a protection for the hull proper and also prevents drift of the boat when blown by the wind. To the rear of the false keel, there is provided a rudder 17 supported on a lower bearing 18 extending rearwardly from the false keel. The upper end is connected to a rudder post 19 which extends into the hull and is connected to a suitable tiller or wheel for steering purposes, not shown. Usually there is a space between the forward edge of the rudder and the false keel in which a screw propeller is disposed. Frequently, however, dual propellers are used, in which event they are disposed at opposite sides of the rudder, usually at the same longitudinal position as a single propeller. At a state of rest, the hull usually takes a position in the water as indicated by the line 13.

When the boat is under way, FIG. 2, the bow of the boat rises until the true keel is substantially parallel with the surface of the water. At this time the false keel extends at an angle to the water surface and prevents sidewise drift of the boat through the water in event there is a wind from either side of the boat.

As is well known to those versed in the art, usually the propeller shaft or shafts extend through a seal in the bottom of the boat at an angle. This angle is usually such that the propeller as a whole is inclined, the top being farther toward the stern than the bottom. Under such conditions, the thrust by the propeller is slightly upward as well as forward, and when the bow rises this condition is aggravated so that at high speeds the thrust is still more in an upward direction with a result that there is a tendency to raise the stern and lower the bow. This is supposed to be overcome by the passage of the water under the boat, but as a matter of fact the boat merely rises and rides on its stern, causing a much more severe wake and high angle of attack for the bottom of the boat. This causes the keel to rise out of the water, increasing drift and visibility is reduced due to the high rise of the bow. The angle is also reflected in the position of the deck which is no longer level and is uncomfortable for the boat's occupants. This results in a division of the power thrust, more of it being in an upward direction as the speed increases and less of it being in a forward direction.

Ideally therefore, the objective is to utilize all of the power to move the hull forward and the only forces which raise the bow are the forces acting on the bottom of the hull by the water which becomes the least when the bottom of the hull comes to a position parallel with the water surface. This condition can never be perfectly realized when the propeller is disposed at the conventional angle, which angle increases with speed.

As shown in FIG. 1, I provide a nacelle 20 which is connected to the bottom of the boat. The nacelle may be streamlined to provide a minimum of resistance to water flow and to enhance the directive effect of the propeller. If a single propeller is to be used, the false keel may be cut away and the nacelle disposed in the gap so provided. The nacelle supports a propeller shaft 24, FIG. 3, which is journalled in water lubricated bearings 25 and 25', fore and aft. The shaft projects through the forward end of the nacelle and carries a screw propeller 26.

It will be noted that the center line through the propeller shaft and propeller hub is such that when the hull is in a cruising position, FIG. 2, it is parallel to the surface of the water. At a state of rest, FIG. 1, this center line inclines downward.

The propeller shaft is driven from the engine by a shaft 30 which extends through a rotary water seal and bearing 31 and has a pinion gear 32 in mesh with a second pinion gear 33 carried by the propeller shaft. Obviously other types of gears than those defined may be used.

Water may enter through the front bearing 25 and escape through a port 27 at the rear of the nacelle as well as a port 27' at the lowest portion of the nacelle. The port 27' may be open or closed as desired.

The invention adapts itself most readily to the use of dual propellers which may be driven from single or dual engines.

In this instance, separate nacelles for each propeller are provided, connected to the hull on opposite sides of the keel. This is best shown in FIGS. 1, 2 and 5.

It should be pointed out that the nacelle is preferably slightly larger in diameter than the propeller blades and thus acts as a skeg, protecting the propeller.

Preferably the nacelle should be sufficiently sturdy and so disposed on opposite sides of the keel that they, together with the keel, provide a support for the hull when the boat is removed from the water, eliminating the need for a cradle or the laborious use of blocks to properly hold the boat when it is in storage or being conditioned for service.

Figure 3:
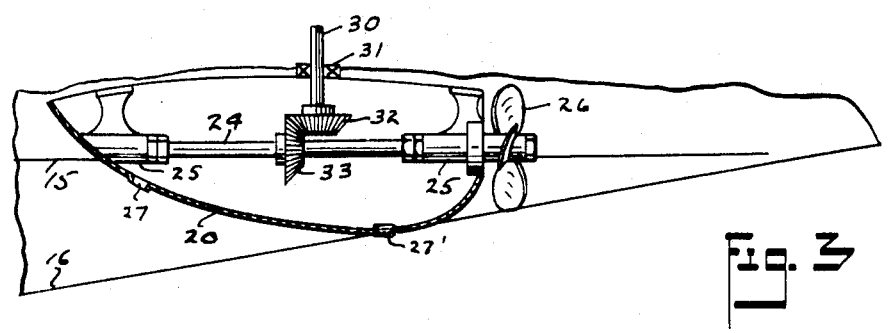
FIG. 3 is a fragmentary view, on an enlarged scale, of the power drive of my invention.

As can best be seen from FIGS. 2 and 3, the nacelle may be a partial nacelle, the upper part being attached to the boat throughout almost or all of its length. This is particularly desirable in connection with shallow draft boats. When it is used in conjunction with boats having a deeper keel, the nacelle may become a substantially complete nacelle 20' connected to the hull by a relatively narrow streamlined hollow stem 35, as shown in FIGS. 6 and 7. Preferably the nacelle should be located at or near the center of gravity for the hull.

Figure 4:
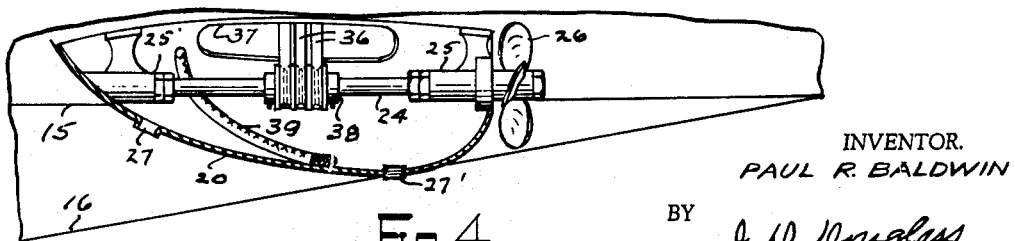
FIG. 4 is a similar view of a modification thereof.

It will be appreciated that power may be delivered from the engine or engines to the propeller shafts 24 in many different ways. In FIG. 4, I have shown a belt drive. In this instance the transmission would be provided with a power take-off shaft which would have a sheave or a multiple sheave over which a plurality of "V" belts 36 would be trained, the belts passing down through an opening 37 in the bottom of the hull and being trained around a multiple type pulley 38 secured to the shaft 24. In this event, the bottom drain hole 27' would be closed by a suitable plug and excess water in the nacelle would be pumped out by a pump driven by the engine and connecting through a conduit 39 to the bottom of the nacelle. The belt 36 may be a series of belts or it may be one of the well known belts having a plurality of wedge shaped pulley engaging portions connected together by a single backing.

As a modification of the invention illustrated in FIGS. 8 and 9, I contemplate that the nacelle be mounted on a connector or strut 40 so that the degree of tilt may be controlled or varied. In this instance, the connector or strut 40 is provided at its lower end with outwardly extending arcuately curved flanges 41. The nacelle is provided with cooperating arcuately curved ways 42 which are inwardly turned and interlock with and hold the flange 41. The nacelle may be slid backward and forward on the ways and when so slid, due to the arcuate contour of the ways, the tilt of the nacelle is changed.

In this case, the drive shaft 30 is provided with means to permit inclination thereof as the pinion gear is moved forward or backward, such as a universal joint 43.

The device of FIGS. 8 and 9 lends itself as an assembly which may be attached to boats having different hull designs, where the cruising angle may vary through a wide range. Once the propeller cruising angle is determined, the nacelle may be adjusted to the position where it operates most efficiently and then secured in that position.

It may be desirable, however, to provide a nacelle which may be tilted at various angles, which may be changed with the speed of the boat. In this event, a slight modification of the structure shown in FIGS. 8 and 9 can be made, as illustrated in FIGS. 10 and 11. In this instance, the flange 42 on the nacelle has a gear rack 43 secured thereto and an adjusting spur gear 44 is in mesh with the teeth of the rack. A shaft 45, connected to the gear 44, extends up through the strut and the bottom of the hull, where it is supported by a bracket 46 and is provided with an adjusting handle 47. When the handle is rotated the gear 44 is rotated and the rack and its nacelle is moved forward and backward. The sliding surfaces between the nacelle and strut being arcuate, the angle of tilt of the nacelle and its propeller may be adjusted to the desired degree. The handle 47 may be calibrated or other suitable indicator connected to the control shaft 45 in order that the position of the nacelle will be shown at all times.

Although I have shown the use of shafts and gears and belts for connecting the propeller to the engine, it will be apparent that the construction lends itself equally well to the use of fluid drive couplings.

Although I have described the combination of the nacelle and propeller being such as to have the nacelle act as a skeg or protector for the propeller and also providing a support for the boat when it is out of the water, I also contemplate that the bare essentials for supporting a propeller and its drive amidship may be used. This would be particularly desirable in connection with boats which are designed to cruise at high speeds. For instance, as illustrated in FIGS. 12 and 13, the strut 50 is considerably smaller, being large enough to house the power shaft and still provide a support for a gearing in a small housing 51 from which a propeller 52 is driven. The entire assembly could be substantially as provided for a conventional outboard motor except that the propeller should be a tractor operating type rather than the pusher type. It likewise would be designed so that the thrust is in forward horizontal direction at cruising speeds.

It is also contemplated that the invention may be used with existing boats having conventional power plants. In FIG. 14 there is illustrated the stern portion 60 of the hull of a conventional boat, wherein the propeller shaft 61 comes through the boat at the usual angle and is supported near its end by the usual bracket 62. In this instance, the propeller is removed and a bracket adapter, which comprises a housing 64 having mounted therein gears 65 and 66 is secured to the bracket by a clamp 67. The gear 65 replaces the propeller that is removed and the gear 66 in mesh with the gear 65 has a shaft 68 connected thereto. The shaft 68 extends forward and amidship of the boat and is supported by a strut 69 connected to the bottom of the boat. The propeller 70 is mounted on the shaft 68 forward of the strut. The shaft 68 is thus supported at each end, at the rear by the housing and at the front by the strut.

The above can be installed in a minimum of time on existing boats with little or no modification thereof other than removing the propeller and securing the forward strut to the bottom of the hull. The forward strut can be made of two parts which are adjusted one within the other to vary the tilt angle, if desired. Obviously should a universal drive be made, it would be desirable to provide a universal joint, or other flexible coupling in the shaft 68, preferably at the rear housing to enable the shaft to be moved vertically at the front end. It is apparent that the structure of FIG. 14 can be used with boats having a single power plant and propeller as well as boats having more than one power plant and propeller.

It will also be apparent that my invention lends itself readily to boats using the hydrofoil principle, as shown in FIGS. 15 and 16. In this instance, the nacelles 70 could be mounted on opposite sides of the hydrofoil planes 71 and the power delivered to the propeller 72 through the hydrofoil struts 73.

It should also be pointed out that jet propulsion members may be used to replace the propellers.

In FIGS. 17 and 18 I have illustrated my invention as applied to the hull of a boat wherein the tilt of the propeller may be adjusted within the nacelle and from within the boat. To this end, the engine shown at 80 is provided with the usual transmission including a reversing gear 81. A power shaft 82 extends from the transmission and is supported at its end in a bearing 83. A multiple groove sheave 84 is secured to the shaft and carries a belt or belts 85 which extend down through a port 86 in the bottom of the hull.

A nacelle similar to that shown in FIG. 14 is secured to the bottom of the hull.

Also secured to the hull is a downwardly extending strut 87 which is flanked by a pair of plates 88 that are pivotally connected to the strut 87 at 89. The plates 88 are connected to and support a bearing 91, which in turn supports the front end of the propeller shaft 92, the shaft extending out of the nacelle and having the propeller 93 thereon. The rear end of the shaft 92 is journalled in a bearing member 95, which consists of a pair of side plates 96 connected together at their front edges by a web 97. A strut 98 secured to the bottom of the hull extends down between the plates 96. The web 97 carries a hook bolt, the hook end 99 of which extends through an arcuate slot in the plate 98. Thus the entire propeller shaft assembly may be tilted about the pivot 89 and held in the desired adjusted position by the bolt 99. Obviously means such as idlers will be used to take up the slack in the belt or after the desired adjustment is made the correct size belts would be used. Also the shaft 82 may have a flexible connection to the transmission and the support for the bearing 83 being movable so that proper parallelism may be maintained between the sheaves.

The device has the advantage that it provides a tilt adjustment for the propeller which may be adjusted through port 86. Furthermore the angle of the propeller may be adjusted without changing the position of the nacelle.

In addition to the other advantages heretofore enumerated, the arrangement of dual propellers under or near the center of the boat allows one propeller to be run forward and the other backward, enabling the boat to turn within its own length on its center axis, which is not possible in other dual propeller devices.

It will be apparent that the shape of the nacelle may varied. Preferably it is desirable to have it slightly larger than the propeller for the protection it affords. It should be noted, however, that it may be greatly reduced in size, being only large enough to provide a support for the propeller shaft. This would eliminate all unnecessary drag and thus enable greater speed to be attained.

Figure 19:
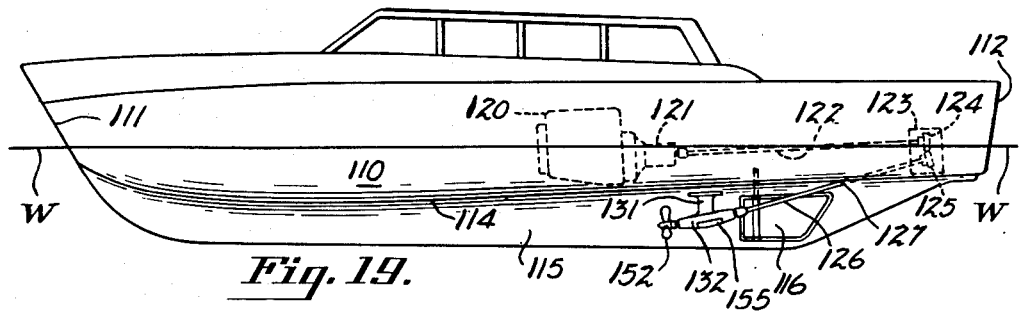
FIG. 19 is a side elevational view of a boat embodying my new drive, illustrating the boat at rest and showing in dashed lines the placement of the engine and the drive shafts.
Figure 20:
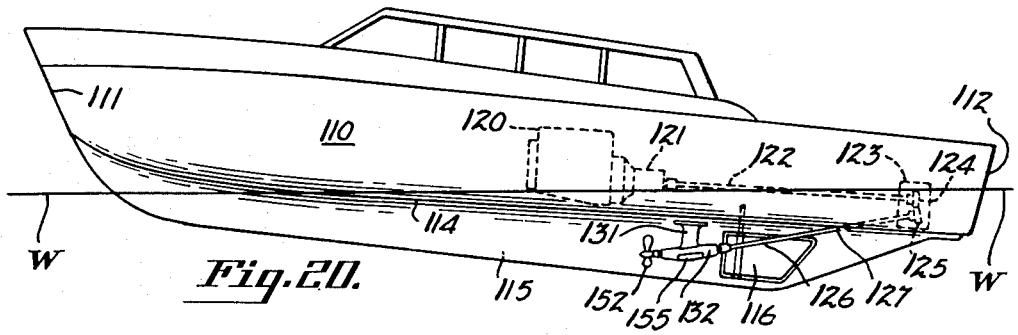
FIG. 20 is a view of the same boat at cruising speed.

In FIGS. 19 and 20, there has been illustrated a conventional form of cabin cruiser which includes the hull 110, having a bow 111, and a stern 112. The bottom of the hull is at 114 and a keel 115 is provided, in the usual manner, extending along the longitudinal mid-line of the hull from the bow to the stern. Although the keel is illustrated slightly deeper than most keels, it may be of conventional design. An imaginary water line is indicated at W.

Interiorly of the boat there is provided the usual engines 120, each having a clutch and reversing transmission 121. Each drive shaft 122 extends to the rear and into a gear box 123 which contains an upper driving gear 124 and a lower driving gear 125. Other types of gear box and gearing may be used so long as it may be driven from a shaft such as 122 and can drive a shaft 126 which extends from the gear box forward and downward through a suitable water-tight bearing located at 127, through the bottom of the hull.

Figure 23:
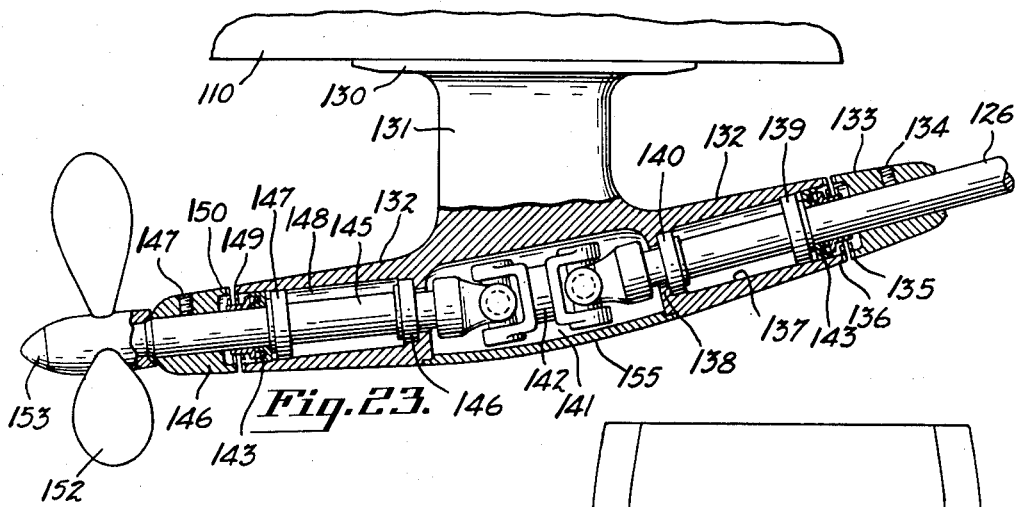
FIG. 23 is an enlarged view of the propeller support broken away to show a form of interior construction.

The forwardly and downwardly inclined driven shafts 126 each connect to a propeller support and shaft angle changing device, shown in detail in FIG. 23. This support includes a base flange 130, the upper surface of which is contoured to fit the underside of the hull at the place of attachment and is secured to the bottom of the hull by suitable bolts, not shown. A strut 131 extends downward from the base 130 and carries at its lower end an elongated housing 132. Preferably the strut should be of streamlined cross section so that it provides no undue turbulence of the water through which it passes.

The shaft 126 is provided with a spinner cone 133, which is secured to the shaft, by one or more set screws 134, and revolves with the shaft. The front of the cone is provided with weed cutting blades 135 which cooperate with similar blades 136 on the rear end of the housing 132. The rear end of the housing, which is of generally tubular form, is provided with a bore 137, the forward end of which terminates in an inwardly extending apertured wall 138. A first bearing 139 is provided toward the rear end of the bore and a forward bearing 140 is seated on a seat adjacent the wall 138. The shaft 126 is journalled in the bearings and the forward end extends into a chamber 141 and has its end secured to a yoke of a universal joint 142. A water seal 143 is provided at the rearmost end of the housing outward of the bearing 139.

The universal joint 142 may be of the double joint type, and the forward end connects to a propeller shaft 145 which is journalled in bearings 146 and 147 in a bore 148 similar to bore 137. The forward end of the housing is likewise of generally tubular formation. A water seal 143 is likewise provided for the front end of the housing.

The propeller shaft 145 extends beyond the end of the housing and has a spinner cone 146 secured thereto by one or more set screws 147. The adjacent ends of the spinner cone and the forward end of the housing are likewise provided with weed cutting teeth 150 and 149. The end of the shaft 145 is of conventional formation for receiving, and having secured therein a three blade tractor screw propeller 152 held in place by the usual nut 153.

It will be noted that the two forward and rearwardly extending tubular parts of the housing 132 are so arranged that the drive shaft 126 comes in at one angle and the propeller shaft 145 leaves at a slightly different angle. This is effected by use of the universal joint 142, which may incidentally be either a single or a double joint. Access to the joint compartment 141 may be had through an opening in the bottom of the housing which is closed by a removable plate 155. The plate is sealed in place with suitable gaskets and held in position by screws, not shown. The ultimate angle of the propeller shaft 145 and hence the angle of the axis of the propeller to the surface of the water when the boat is at rest, should be such that at cruising speed the axis of the propeller is parallel to the surface of the water. It is apparent that for boats of different hull design the amount of angularity may vary. As explained in my copending applications, means may be provided operated from the interior of the boat whereby the angle may be varied to provide the desired angle.

Figure 25:
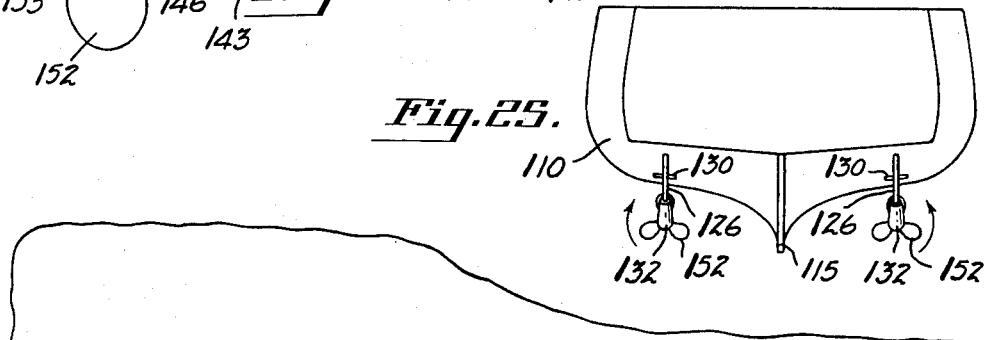
FIG. 25 is a diagrammatic stern elevational view of a boat illustrating the placement of the propellers.

As best shown in FIG. 25, the two propellers are disposed equidistant from the keel on opposite sides thereof. Here again, the exact spacing from the hull and keel may vary, depending upon the particular design of the hull. It is pointed out that the drive is adaptable to boats which may have substantially no keel at all, such as flat bottom boats and sea sleds.

The preferred location for the propeller should be about one-third of the boat's length ahead of the stern. In some boats, however, it may be desirable to move it farther forward.

Figure 21:
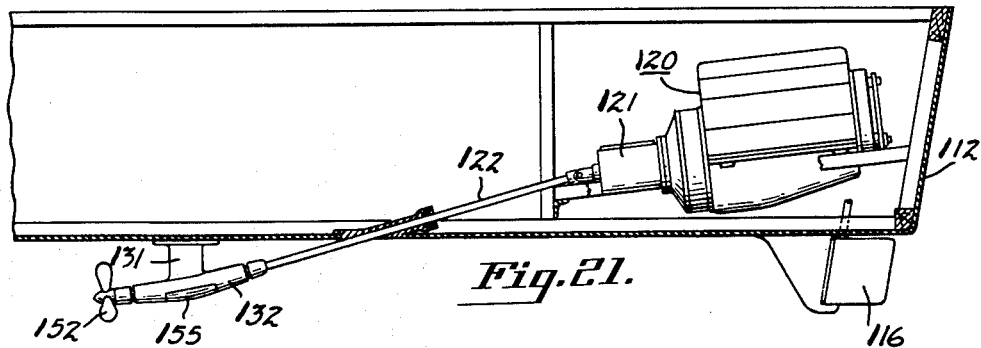
FIG. 21 is a fragmentary diagrammatic view of a boat showing an engine mounted in the rear.
Figure 22:
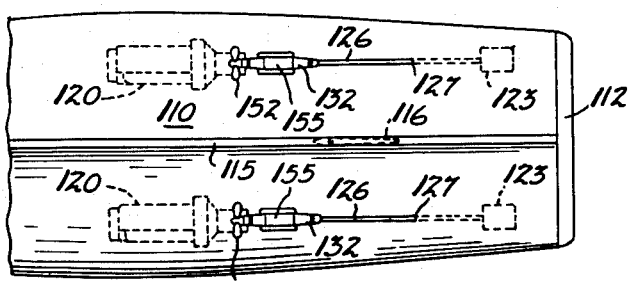
FIG. 22 is a fragmentary bottom plan view of the boat of FIGS. 19 and 20.

When the device is applied to existing boats that have been designed for the usual pushing type propellers, the rudders may be in the standard position as illustrated in FIG. 21. In the boat shown in FIGS. 19 and 20, however, a single rudder 116 has been illustrated which is set into an opening in the keel. It is suspended and controlled in the usual manner by a tiller or wheel from inside the boat.

Figure 24:
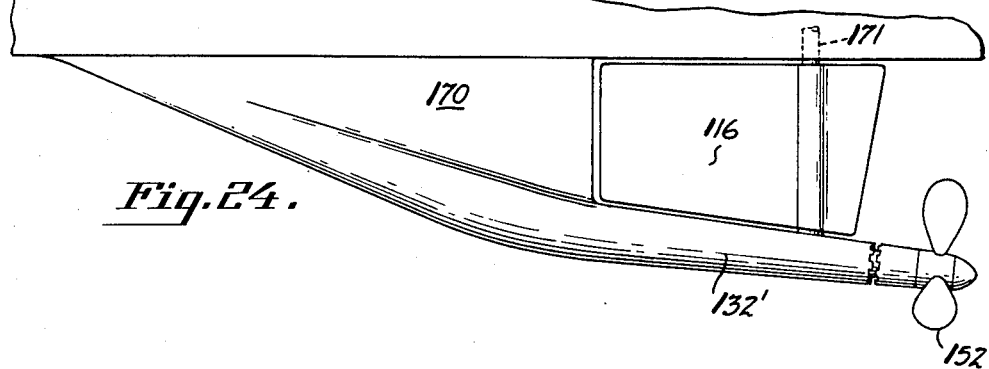
FIG. 24 is a fragmentary elevation of another form of propeller and rudder support.

In FIG. 24 I have illustrated another type of unit where instead of a rather narrow strut, as shown in FIG. 19, the support comprises a main housing in the form of a pair of spaced webs 170, which house the drive shaft. The tube 132' extends forward and downward from the main housing at an angle with the propeller 152 supported outward of the tube in the same manner as the other embodiment. The bottoms of the spaced webs may be closed. In this instance, however, the space between the tube 132' and the bottom of the hull or keel is used to house the rudder 116 which is supported on the usual shaft 171.

The placement of the engine or engines in the hull may also vary. Since most of the existing boats have the engine amidship, the design of FIGS. 19 and 20 has been illustrated. This enables boats with conventional drive to be more easily converted to the drive of my invention with a minimum of expense. It may be desirable, however, in some boats and particularly in boats specifically designed for drives of my invention, to place the engine in the stern of the boat, as shown in a more or less diagrammatic manner in FIG. 21. In this instance, the gear box 123 for reversing the direction of the shafts is not needed.

It is particularly pointed out that the invention is useful in conjunction with single engine boats as well as double engine boats. However certain additional advantages are obtained from the double engine boats.

As is well known to those versed in the art, it is most common, in twin engine propeller boats, to have the propeller on the starboard side rotate in a clockwise direction and the propeller on the port side in counter clockwise direction, as viewed from the stern of the boat.

Although the propellers may rotate the same way in the drive of my invention, I believe that an improved mode of operation is realized by causing the starboard propeller to rotate counter clockwise and the port propeller clockwise as shown by the arrows in FIG. 25.

The results of the drive on my invention, from actual tests applied to a 27-foot twin engine cabin cruiser, have proven that the boat which normally cruised at an angle of 12° after conversion cruised at an angle of 6°, with no loss in forward speed and with a reduction in engine speed from 2500 r.p.m. to 2000 r.p.m. The decrease in the angle made the visibility much greater and the pilot and the passengers were much better able to see where they were going. The gasoline consumption was materially reduced. With this boat, which had conventional rudders and with the shaft angle as shown in FIGS. 19, 20 and 23 and the support of FIG. 23, the steering of the boat was extremely easy. So much easier in fact than that of the boat before the conversion, that it could be likened to power steering.

By reversing one propeller, the boat could be made to turn within its own length without headway.

Of particular importance was the fact that in rough seas the propellers at no time were able to break water. This kept them fully submerged and provided a constant bite on the water, with constant forward speed, and no loss of headway, as occurs with conventional drives where the propeller is in the rear.

Another important feature was the fact that the pitching and rolling of the boat was materially reduced and was substantially eliminated in seas up to four feet.

It is believed that the following explanation is a true explanation of why the abovementioned results were obtained. Should it later appear that the theories expressed may be due to a different explanation, I do not wish to be bound thereby.

As to the decrease in the crusing angle, this is due to the fact that, as the boat comes up to cruising speed, the axis of the propeller is parallel to the surface of the water. All of the power is utilized in pulling the boat straight forward and none of the power is wasted in trying to push the boat out of the water.

The elimination of the usual angle of the propeller relative to the surface of the water materially increases the efficiency since the down-going blade and the up-going blade each have the same angle of attack to the water.

The decrease in engine speed was possible because of the position of the propeller which increased its efficiency.

The increase in boat speed with reduced engine r.p.m. is due to the elimination of the angle of the propeller and to the fact that the boat rises higher in the water and has less of an angle of attack. It is also due to the fact that with a tractor type of propeller and with the propeller placed forward from the stern, it obtains an even bite into water that has not been disturbed by wake and which is below the troughs of the waves.

The improvement in the steering is due to the fact that the backwash from the propeller is not striking the rudder and therefore does not have the same stiffening effect as where the propeller is throwing the water back at a high rate of speed on each side of the rudder.

The turning radius of the boat is decreased because the propellers are closer to the center of the boat and when operated in opposite directions, one pushes and the other pulls, which efforts are applied to opposite sides of the boat closer to the widest beam.

The increase in stability is realized because with the tractor propellers the water is being moved backwards under the boat at a relatively high speed. This water flowing under the boat, increases its buoyancy and prevents the boat from pitching and rolling. This effect is increased by the direction of rotation of the propellers since this rotation is such that the water at the tips of the propeller impinges against the hull in a direction inward toward the keel. This provides greater longitudinal stability both in vertical and horizontal directions. It was found that even with one propeller operating the boat did not veer.

In rough seas the pitching and rolling is less because the propeller is always immersed and never breaks water. Even with large waves the propellers do not break water because they are forward of the stern and at or near the natural center of gravity of the boat, whereas in ordinary boats it is the bow and the stern which break from the water most frequently.

It is apparent that the exact placement of the propellers will vary, depending upon the design of the hull. The best position appears to be at least one-third of a boat length ahead of the stern and that if it is at the center of gravity of the boat when it is in the water the probability of the boat ever rising high enough to cause the propellers to break water is very remote, particularly in boats of the so-called cabin cruiser type.

Having thus described my invention in some embodiments thereof, I am aware that numerous and extensive departures may be made therefrom without departing from the spirit of the invention as defined by the appended claims.

I claim:

1. A boat propulsion system wherein at least one engine is provided inside the hull of the boat, a drive shaft means connected to and driven by said engine and extending forwardly and downwardly through the hull, propeller support means connected to the underside of the hull and including a streamlined housing disposed spaced from the hull, said drive shaft extending into the rear of the housing, universal joint means disposed within the housing and connected to said shaft, a propeller shaft extending from the front of said housing and having one end connected to said universal joint means and a tractor type propeller carried by the other end spaced from the hull, said housing having forwardly and rearwardly extending angularly related tubular parts receiving respectively said propeller shaft and said drive shaft.

2. A system as described in claim 1, wherein the axis of said propeller is inclined forward and downward when the boat is at rest and where the angle of inclination is such that said axis is substantially parallel to the surface of the water when the boat is at cruising speed.

3. A boat propulsion system, said boat having a hull, a pair of engines disposed within the hull forward of the stern, drive shafts connected to the engines extending toward the stern, driven shafts extending from the stern forward and downward through the hull and gear means connecting each of said two shafts together in driving relation, housings supported under the hull and one of each of said driven shafts extending into the housings, universal joint means disposed within the housings and said driven shafts connected thereto, propeller shafts supported by the housings and said universal joint means being drivingly connected thereto, tractor propeller means carried on the end of each propeller shaft, said housing having forwardly and rearwardly angularly related tubular parts receiving respectively said propeller shaft and said drive shaft.

4. An apparatus as described in claim 3, wherein the axes of said propeller shafts are inclined forward and downward when the boat is at rest, the angle of inclination being such that when the bow rises at cruising speed the axes of the propellers are substantially parallel to the surface of the water.

5. An apparatus as described in claim 4, wherein said propellers are revolved in opposite directions.

6. An apparatus as described in claim 4, wherein the starboard propeller is turned in a counter clockwise direction and the port propeller in a clockwise direction as viewed from the stern.

7. A boat propulsion system, said boat including a hull and a keel extending longitudinally of the hull below the hull, a pair of engines disposed within the hull, shaft means for each of said engines extending from the engines through the hull on opposite sides of said keel and toward the bow of the boat, a pair of support means, one being connected to the bottom of the hull on one side of the keel and the other on the other side of the keel and each comprising a streamlined strut, each strut having a housing means carried on the lower end thereof, each of said shaft means extending into a housing, a universal joint in each housing connected to said shaft, a propeller shaft extending from the other end of each housing and each being connected to said universal joint and a bladed tractor screw propeller carried on the end of each propeller shaft on each side of the keel, each of said housings having forwardly and rearwardly angularly related tubular parts receiving respectively a propeller shaft and a drive shaft.

8. A system as decribed in claim 7, wherein the axes of said propellers are inclined forwardly and downwardly when the boat is at rest, the angle of inclination being such that at crusing speed the axes of said propellers are substantially parallel to the surface of the water.

9. A system as described in claim 8, wherein said engines drive the propellers in opposite directions and the propellers are disposed at least one-third of a boat's length ahead of the stern.

10. A system as described in claim 9, wherein the propellers operate with the uppermost blades of each propeller, rotating inwardly toward the keel.

11. A system as described in claim 10, wherein the propellers are disposed spaced from the hull and keel and the lower blades are above the bottom of the keel.

References Cited by the Examiner

UNITED STATES PATENTS

| | | | |
|---|---|---|---|
| 2,045 | 4/41 | Baard | 115—34 |
| 122,640 | 1/72 | Niles | 115—37 |
| 625,907 | 5/99 | Stathakis | 115—37 |
| 768,336 | 8/04 | Manker | 115—37 |
| 804,497 | 11/05 | Palmer | 115—42 |
| 931,177 | 8/09 | Bell | 114—57 |
| 985,187 | 2/11 | Lindgren | 114—57 |
| 1,227,784 | 5/17 | Hewitt | 114—66.5 |
| 1,605,376 | 11/26 | Schmitt | 114—66.5 X |
| 1,717,286 | 6/29 | Ward | 114—57 |
| 2,196,706 | 4/40 | Naginskas | 114—57 |
| 2,381,622 | 8/45 | Sheppard | 115—37 |
| 2,460,339 | 2/49 | Duamantides | 115—34 |
| 2,691,356 | 10/54 | Waterval | 115—37 |
| 2,812,738 | 11/57 | Munro | 115—42 X |
| 2,859,634 | 11/58 | Walter | 115—34 |
| 2,918,029 | 12/59 | Legat | 114—66.5 |
| 2,956,536 | 10/60 | Kelvington | 115—41 X |
| 3,105,454 | 10/63 | Baldwin | 115—37 |
| 3,105,455 | 10/63 | Baldwin | 115—37 |

FOREIGN PATENTS

| | | |
|---|---|---|
| 41,863 | 1/48 | Denmark. |
| 853,715 | 10/52 | Germany. |
| 597,570 | 1/48 | Great Britain. |
| 53,201 | 2/19 | Sweden. |

MILTON BUCHLER, *Primary Examiner.*

FERGUS S. MIDDLETON, *Examiner.*